UNITED STATES PATENT OFFICE 2,606,194

PHENYL PYRIDYL CARBINOL ETHERS

Robert S. Shelton, Mariemont, and Charles H. Tilford, Silverton, Ohio, assignors to The Wm. S. Merrell Company, Cincinnati, Ohio, a corporation of Delaware No Drawing. Application July 11, 1946, Serial No. 682,918

3 Claims. (Cl. 260—296)

This invention relates to new products which are useful in combatting, reducing or minimizing the physiological effects of histamine and other allergens, e. g., for the relief of hay-fever, asthma of allergenic origin, urticaria, and the like.

The new compounds of the invention are the α-phenyl-α-aminoethoxy 2-picolines, which may be represented by the formula

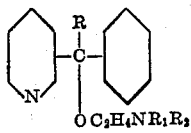

in which R, $R_1$ and $R_2$ represent hydrogen or an alkyl group having not more than three carbon atoms, and in which R, $R_1$ and $R_2$ may be alike or different. The new compounds are basic, and will ordinarily be used in the form of an acid addition salt, i. e., as the hydrochloride, hydrobromide, sulfate, phosphate, glycolate, acetate, tartrate, levulinate, or the like, by oral administration in the form of tablets or other suitable form. The hydrochlorides and hydrobromides are white, crystalline materials. The free bases are distillable under vacuum and may be converted to the salts by simple neutralization with the required amount of acid, while the acid addition salts may be converted to the free base by treatment with caustic or carbonated alkali in the usual way.

The new products are conveniently prepared by heating the corresponding phenyl-(2-pyridyl)-carbinol with the corresponding amino-alkyl chloride or other salt in the presence of sodium, with purification of the free base product by distillation, or crystallization, or by conversion to a salt followed by crystallization. This will be illustrated by the following examples, but the invention is not limited thereto.

*Example I.*—To 40 parts of phenyl-methyl-(2-pyridyl)-carbinol in 240 parts of toluene was added 4.35 parts of sodium. The mixture was refluxed with stirring until all of the sodium had dissolved. Then at 60–70°, 17 parts of β-dimethylaminoethyl chloride in 160 parts of toluene were added during 30 minutes followed by refluxing for an equal period. A second 4.35 part portion of sodium was added; the mixture was refluxed 5 minutes; and 17 parts more of the dimethylaminoethyl chloride in toluene was added as above followed by refluxing for 3 hours. The mixture was washed with 100 parts of water and distilled. At 145–7°/1 mm., 12 parts of unchanged phenyl-methyl-(2-pyridyl)-carbinol was collected; and at 156–9°/1 mm., 12 parts (40% based on recovered starting material) of the desired amino ether was obtained. Converted to the hydrobromide gave a crystalline product which melted at 123–5° when recrystallized from butanone.

*Example II.*—To a mixture of 18.5 parts of phenyl-(2-pyridyl)-carbinol in 160 parts of xylene were added 2.3 parts of sodium. The mixture was refluxed with stirring for 6 hours; and at 60–70°, 15 parts of β-dimethylaminoethyl chloride in 160 parts of toluene was added during 30 minutes followed by refluxing for 3 hours. The solvent was removed under vacuum distillation. The residue was taken up in 80 parts of benzene and extracted once with 25 parts of 10% hydrochloric acid. The aqueous extract must have a pH higher than 8 or else some of the starting phenyl-pyridyl-carbinol will be extracted. The water was removed on the steam bath under vacuum and the residue was recrystallized under anhydrous conditions from butanone. The white crystalline hydrochloride obtained melted at 98–100° and was hygroscopic.

These compounds are highly effective as histamine antagonists, and are useful in the treatment of hay-fever, asthma, urticaria, and other ailments of the character associated with physiological reactions to histamine or the like, i. e., the so-called allergic responses or syndromes. Other compounds included in the invention and useful for the same purposes include:

α-($2^1$ - diethylaminoethoxy)-α-methyl-α-phenyl-2-picoline;
α-($2^1$-methylpropylaminoethoxy)-α-phenyl-2-picoline;
α-($2^1$ - dimethylaminoethoxy)-α-phenyl-α-ethyl-2-picoline;
α-($2^1$ - aminoethoxy) - α - phenyl-α-propyl-2-picoline.

We claim:
1. Compounds of the formula

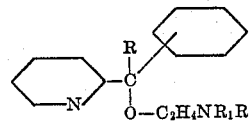

in which R is an alkyl radical with not more than 3 carbon atoms and in which $R_1$ and $R_2$ are selected from the group consisting of hydrogen and alkyl radicals with not more than three carbon atoms.

2. α-($2^1$-dimethylaminoethoxy) - α - phenyl - α-methyl-2-picoline.

3. α-(2¹-dimethylaminoethoxy) - α - phenyl - 2-picoline in which the α-carbon atom is further substituted by an alkyl group with not more than three carbon atoms.

ROBERT S. SHELTON.
CHARLES H. TILFORD.

REFERENCES CITED

The following references are of record in the file of this patent:

Journal Chem. Soc. pp. 809–812 1939.
Chem. Abstracts, vol. 35; 4771³, citing Rec. Trav. Chim. vol. 59, pp. 971–977 (1940).
Journal of Pharmacology, vol. 83 pp. 120–128 (1945).
Hartman—California Medicine 66 No. 4 pp. 242–248 (1947).
Sidgwicks—Organic Chemistry of Nitrogen page 522.